July 31, 1962  J. BLOEM  3,047,380
METHOD OF MAKING SEMI-CONDUCTIVE MATERIAL
FOR USE IN SEMI-CONDUCTIVE DEVICES
Filed Jan. 21, 1960
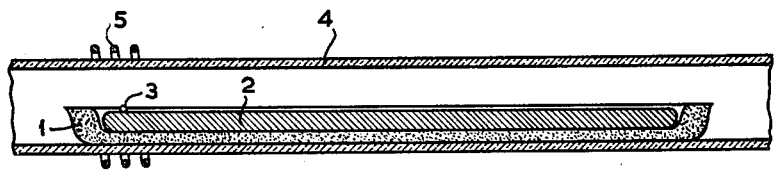
INVENTOR
JAN BLOEM
BY
AGENT

United States Patent Office 3,047,380
Patented July 31, 1962

3,047,380
METHOD OF MAKING SEMI-CONDUCTIVE MATERIAL FOR USE IN SEMI-CONDUCTIVE DEVICES
Jan Bloem, Nijmegen, Netherlands, assignor to North American Philips Company, Inc., New York, N.Y., a corporation of Delaware
Filed Jan. 21, 1960, Ser. No. 3,865
Claims priority, application Netherlands Jan. 23, 1959
6 Claims. (Cl. 75—84)

This invention relates to methods of making semi-conductive material for use in the manufacture of semi-conductor devices.

In particular, this invention relates to a method of purifying germanium by means of a zone melting process. In such a process usually at least one molten zone is moved through a rod-shaped germanium body in the direction of the length thereof so that the material melts at one side and crystallizes out at the other side, most impurities remaining in the molten germanium and being effectively carried along by the molten zone so as to be concentrated at the end of the rod-shaped body. After the end is removed, the material remaining is used in the manufacture of transistors, diodes and photo-electric cells.

However, there are impurities, hereinafter referred to as non-segregable impurities, which remain distributed comparatively uniformly in the liquid and in the solid germanium during the zone melting process, so that they cannot be simply removed from the germanium by means of a zone melting process.

It has already been suggested to remove non-segregable impurities from the germanium by adding to the germanium an element capable of forming a compound with such an impurity and subsequently subjecting the germanium to a zone melting process.

It has now been found that when oxygen, which is normally present in germanium and can also be considered as an undesired non-segregable impurity, is to be removed, the use of the last-mentioned process provided difficulty. Even the addition of highly reducing elements did not provide an effective solution. The present invention is based on the recognition of the fact that most of the oxides produced form inclusions in the solid germanium which unfavourably affect the properties of this material. The invention is also based on the recognition that the oxides of most elements suited to be added have a specific gravity which is only slightly different from that of molten germanium, so that during the zone melting process particles of these oxides remain suspended in the molten zone (due to the occurring convection currents) and are enclosed by the germanium crystallizing out. According to the invention, oxygen is removed from germanium by the addition to the germanium, before passing through at least one molten zone, of at least one element that has a greater affinity for oxygen than germanium, that is capable of forming an oxide having a specific gravity differing by at least 25% from that of molten germanium, and that has a segregation constant which is so small that the added element can be removed from the germanium by means of the zone melting process. The specific gravity of molten germanium is 5.94. Suitable elements are tantalum, thorium, uranium, beryllium, magnesium and titanium, these elements having very great affinities for oxygen and segregation constants substantially smaller than 0.01. During the process, the oxide produced in the method according to the invention can separate from the molten zone due to its different specific gravity, either by settling, for instance the oxides of tantalum, thorium and uranium with specific gravities larger than 7.5, or by floating on the melt, for instance the oxides of beryllium, magnesium and titanium with specific gravities smaller than 4.4.

Preferably, an element is chosen which is capable of forming an oxide having a specific gravity smaller than 4. This ensures a rapid separation of the oxide in the form of a layer on the free surface of the melt, which can be readily removed subsequently. Furthermore, the deposition of an oxide coating on the inner surface of the crucible in which the zone melting process is generally carried out is substantially avoided.

Preferably, the element is chosen from the elements of the second group of the periodic system which have an atomic number smaller than 13.

Magnesium proved to be a pre-eminently suitable element, since the segregation constant of this element in germanium is very small, that is to say of the order of $10^{-5}$, and the oxide has a specific gravity of only 3.7. Beryllium can also be used, its oxide having a specific gravity of 3.0. Another suitable element, which does not belong to this group, is titanium. It should be noted that, when choosing the element, it is not sufficient to look only to the affinity to oxygen and the specific gravity of the oxide; the segregation constant also must be so small that the element itself can be removed substantially entirely. Aluminum, for example, satisfies the first two requirements but does not satisfy the last one and hence is unsuitable for the end in view.

After the addition of the magnesium, preferably two molten zones are passed through the germanium. This is sufficient to eliminate an appreciable influence of this element on the properties of the germanium. Although in theory a very small amount of magnesium, for example $10^{-3}$ atomic percent, in the molten zone would be sufficient to bind the oxygen in the germanium, in practice preferably a larger amount is used, that is to say at least 0.1 atomic percent, in order to ensure a rapid and more complete binding of the oxygen. Before the molten zone is shifted, preferably an amount of magnesium is dissolved in this zone which is at most 5 atomic percent of the amount of germanium in this zone. If larger amounts of magnesium should be added, an appreciable portion of this magnesium is likely to evaporate and to condense again behind the molten zone and this would provide too high a concentration in a second zone traversing the germanium.

In order that the invention may readily be carried out, an example will now be described more fully with reference to the accompanying drawing.

The FIGURE shows a vertical sectional view of a device for zone melting of germanium, one stage of the method in accordance with the invention being shown.

Example

In an elongated crucible 1 (see the Fig.) made of graphite having an inner length of 30 cms., a width of 2 cms. and a height of 2.5 cms., there is arranged a bar of germanium 2 of the same length having a cross-sectional area of 4 sq. cms.

On the left-hand end of the bar 2 there is placed a pellet 3 having a weight of 0.3 gram and consisting of an alloy of 60 atomic percent of germanium and 40 atomic percent of magnesium. The addition of pure magnesium itself is less suitable as the vapour pressure of magnesium at the melting point of germanium is substantially high (about 100 mm. Hg) and thus the magnesium would evaporate at least to a considerable extent.

The crucible 1 is subsequently placed in a horizontal quartz tube after which a stream of pure, dry gaseous hydrogen which does not contain oxygen or nitrogen is passed through the tube 4.

By means of a high-frequency induction coil 5, which is moved with respect to the crucible 1 at a speed of 2 mms. per minute, a molten zone is passed through the bar 2, which zone has a length of 2 cms., the magnesium dissolving in this zone so that it obtains a content of magnesium of approximately 1 atomic percent.

When the molten zone containing the magnesium is passed through the bar, the magnesium entirely binds the oxygen present in the bar, a layer of magnesium oxide being produced on the bar 2.

After one molten zone has been passed through the bar, this operation is repeated once in order to remove the last traces of magnesium from the germanium. Then the bar is taken from the crucible and the portion which is the last to solidify (at the right in the drawing) is cut off through a length of 4 cm. This portion contains the larger part of the magnesium.

Then the obtained body is etched with an aqueous solution of HF and $HNO_3$, the layer of magnesium oxide being entirely removed.

When a second molten zone is passed, significant impurities can be added to the germanium in the usual manner so as to impart a desired conductivity type and specific conductivity thereto. Furthermore, a single-crystal bar can be obtained by means of a seed crystal.

Although in the example described a molten zone was moved through the bar twice only, obviously further zones can be passed through the bar. However, care should be taken that no oxygen from outside can dissolve in the last-mentioned zones, as there is no longer magnesium present in those zones to bind this oxygen.

What is claimed is:

1. A method of removing oxygen from and purifying a germanium body by zone-melting, comprising the steps of adding to the germanium body an element having the following combination of properties:
   (a) a greater affinity for oxygen than that of germanium,
   (b) forms an oxide whose specific gravity differs by at least 25% from that of molten germanium,
   (c) a relatively small segregation constant enabling its removal from germanium by zone-melting;
thereafter passing a molten zone through the germanium body to sweep the said element if uncombined to one end, and removing any oxide formed by said element from the body.

2. A method of removing oxygen from and purifying a germanium body by zone-melting, comprising the steps of adding to the germanium body an element having the following combination of properties:
   (a) a greater affinity for oxygen than that of germanium,
   (b) forms an oxide whose specific gravity is smaller than 4,
   (c) a segregation constant smaller than 0.01 enabling its removal from germanium by zone-melting;
thereafter passing a molten zone through the germanium body to cause the said element to combine with any oxygen present to form an oxide and to sweep the said element if uncombined to one end, and removing any oxide formed by said element from the body.

3. A method of removing oxygen from and purifying a germanium body by zone-melting, comprising the steps of adding to the germanium body an element selected from the group consisting of tantalum, thorium, uranium, beryllium, magnesium and titanium, thereafter passing a molten zone through the germanium body to sweep the said element if uncombined to one end, and removing any oxide formed by said element from the body and the said one end of the body.

4. A method of removing oxygen from and purifying a germanium body by zone-melting, comprising the steps of adding to the germanium body a small amount of magnesium, thereafter passing at least two molten zones through the germanium body to sweep the said magnesium if uncombined to one end, and removing any oxide formed by said magnesium from the body surface.

5. A method as set forth in claim 4 wherein the germanium in the molten zone contains between 0.1 and 5 atomic percent of the magnesium.

6. A method of removing oxygen from and purifying a germanium body by zone-melting, comprising the steps of adding to the germanium body a small amount of beryllium, thereafter passing at least two molten zones through the germanium body to sweep the said beryllium if uncombined to one end, and removing any oxide formed by said beryllium from the body surface.

References Cited in the file of this patent
UNITED STATES PATENTS 2,813,048   Pfann _____ Nov. 12, 1957
2,835,612   Taylor _____ May 20, 1958